US011346663B2

(12) United States Patent
Aoki et al.

(10) Patent No.: US 11,346,663 B2
(45) Date of Patent: May 31, 2022

(54) STEREO CAMERA

(71) Applicant: Hitachi Automotive Systems, Ltd., Hitachinaka (JP)

(72) Inventors: Toshiyuki Aoki, Tokyo (JP); Keiichi Betsui, Tokyo (JP); Ichirou Kuzumi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 337 days.

(21) Appl. No.: 16/643,675

(22) PCT Filed: Jul. 18, 2018

(86) PCT No.: PCT/JP2018/026817
§ 371 (c)(1),
(2) Date: Mar. 2, 2020

(87) PCT Pub. No.: WO2019/058729
PCT Pub. Date: Mar. 28, 2019

(65) Prior Publication Data
US 2020/0271447 A1 Aug. 27, 2020

(30) Foreign Application Priority Data
Sep. 20, 2017 (JP) .............................. JP2017-180648

(51) Int. Cl.
*G01C 3/08* (2006.01)
*G02B 27/00* (2006.01)
(Continued)

(52) U.S. Cl.
CPC .......... *G01C 3/085* (2013.01); *G02B 27/0093* (2013.01); *G02B 27/0101* (2013.01);
(Continued)

(58) Field of Classification Search
CPC ................ G01C 3/085; G02B 27/0093; G02B 27/0101; G06T 5/006
See application file for complete search history.

(56) References Cited

U.S. PATENT DOCUMENTS 9,392,129 B2 * 7/2016 Simmons ............. H04N 13/383
2013/0147948 A1 6/2013 Higuchi et al.
(Continued)

FOREIGN PATENT DOCUMENTS

JP 2004-354257 A 12/2004
JP 2012-75060 A 4/2012
(Continued)

OTHER PUBLICATIONS

Grebenyuk, K. A., & Petrov, V. V. (2008). Elimination of geometric distortions in stereoscopic systems with converging optical axes. Optics and Spectroscopy, 104(4), 625-629.*
(Continued)

*Primary Examiner* — Sarah Lhymn
(74) *Attorney, Agent, or Firm* — Crowell & Moring LLP

(57) ABSTRACT

Provided is a stereo camera that is capable of reducing the distance error created by entrance pupil center movement between different principal ray angles of incidence. In the present invention, imaging system unit 100a images a standard image of an object. Imaging system unit 100b images a reference image of the object. A geometric correction information storage unit 114 stores geometric correction information for the standard image and reference image, which each have error depending on the differences between the positions of the object in the standard image and reference image if the entrance pupil center indicating the point of intersection between the principal ray and optical axis moves according to the angle of incidence and the positions of the object in the standard image and reference image if it is assumed that the entrance pupil center does not move (Continued)

according to the angle of incidence. The geometric correction unit 119 geometrically corrects the standard image and reference image using the geometric correction information.

7 Claims, 10 Drawing Sheets

(51) Int. Cl.
*G02B 27/01* (2006.01)
*G06T 5/00* (2006.01)
*G03B 35/08* (2021.01)

(52) U.S. Cl.
CPC ...... *G06T 5/006* (2013.01); *G02B 2027/0129* (2013.01); *G02B 2027/0138* (2013.01); *G03B 35/08* (2013.01)

(56) References Cited

U.S. PATENT DOCUMENTS

| | | | |
|---|---|---|---|
| 2013/0162955 A1* | 6/2013 | Okamoto | G03B 21/2033 353/30 |
| 2013/0250065 A1 | 9/2013 | Aoki et al. | |
| 2013/0335710 A1* | 12/2013 | Okamoto | G03B 21/14 353/30 |
| 2015/0029475 A1* | 1/2015 | Shimizu | G03B 21/2033 353/98 |
| 2015/0226541 A1 | 8/2015 | Aoki et al. | |
| 2015/0288929 A1 | 10/2015 | Tohara | |
| 2015/0332100 A1 | 11/2015 | Yamaguchi | |

FOREIGN PATENT DOCUMENTS

| | | | |
|---|---|---|---|
| JP | 2013-224920 A | | 10/2013 |
| JP | 2014-72592 A | | 4/2014 |
| JP | 2015-197421 A | | 11/2015 |
| JP | 2017-20971 A | | 1/2017 |
| JP | 2017020971 A | * | 1/2017 |
| WO | WO 2014/091877 A1 | | 6/2014 |
| WO | WO 2014/181581 A1 | | 11/2014 |

OTHER PUBLICATIONS

Thibos, L. N., Bradley, A., Still, D. L., Zhang, X., & Howarth, P. A. (1990). Theory and measurement of ocular chromatic aberration. Vision research, 30(1), 33-49.*
Hua, H. (2017). Enabling focus cues in head-mounted displays. Proceedings of the IEEE, 105(5), 805-824.*
Cakmakci, O., & Rolland, J. (2006). Head-worn displays: a review. Journal of display technology, 2(3), 199-216.*
Kumar, A., & Ahuja, N. (2015). On the equivalence of moving entrance pupil and radial distortion for camera calibration. In Proceedings of the IEEE International Conference on Computer Vision (pp. 2345-2353).*
International Search Report (PCT/ISA/210) issued in PCT Application No. PCT/JP2018/026817 dated Nov. 13, 2018 with English translation (five pages).
Japanese-language Written Opinion (PCT/ISA/237) issued in PCT Application No. PCT/JP2018/026817 dated Nov. 13, 2018 (five pages).

* cited by examiner

PRINCIPAL RAY
WHEN DISTANCE IS SHORT

PRINCIPAL RAY
WHEN DISTANCE IS LONG

DEVIATION ON IMAGE
WHEN DISTANCE IS SHORT

DEVIATION ON IMAGE
WHEN DISTANCE IS LONG

| θ | ΔL |
|---|---|
| θ1 | ΔL1 |
| θ2 | ΔL2 |
| ... | ... |

| $a_n$ | $a_{n-1}$ | ... | $a_0$ |
|---|---|---|---|
| ... | ... | ... | ... |

| L | θ | Cx |
|---|---|---|
| L1 | θ1 | Cx1 |
| L2 | θ2 | Cx2 |
| ... | ... | ... |

STEREO CAMERA

TECHNICAL FIELD

The present invention relates to a stereo camera.

BACKGROUND ART

The related art in PTL 1 stores correction information for correcting a distortion of images of two imaging units, and uses the correction information of the images to geometrically correct the two images to calculate parallax between the two images, and then, calculates a distance. Variations in recognition performance are reduced by satisfying at least one of an item that a transmittance of a first optical element on a side of an image used for recognition between the two imaging units is higher than that of a second optical element on the other side, an item that a distortion of the first optical element is smaller than that of the second optical element, an item that a sensitivity characteristic of the first optical element is higher than that of the second optical element, and an item that noise of the first imaging element is smaller than that of the second imaging element.

The related art in PTL 2 creates the correction information for images of the two imaging units stored in the related art of PTL 1. Information for correcting an image distortion is created by installing a chart in front of a stereo camera, capturing an image of the chart on which a pattern with a plurality of feature points is drawn, and detecting a position of the feature point on the obtained image. Images are captured at different distances from the chart, a manufacturing error and an equipment error are estimated based on a difference between positions of feature points of the images, and a deviation of image correction information caused by the manufacturing error and the equipment error is corrected to improve the accuracy of the image correction information.

The related art of PTL 3 performs geometric correction processing of two images, extracts features from the two images, associates the same features on the two images with each other, and corrects a deviation in camera parameters based on these features and the correspondence thereof.

CITATION LIST

Patent Literature

PTL 1: JP 2014-72592 A
PTL 2: WO 2014/181581 A
PTL 3: JP 2004-354257 A

SUMMARY OF INVENTION

Technical Problem

In a camera with a relatively narrow angle of view of about 40° or smaller, a point of intersection (entrance pupil center) of a principal ray and an optical axis is located at a fixed place without depending on a principal ray angle of incidence. In the stereo camera, the distance is measured on the premise of a pinhole camera model in which the entrance pupil center does not move without depending on the principal ray angle of incidence.

However, in a wide-angle camera, the point of intersection of the principal ray and the optical axis (entrance pupil center) varies depending on the principal ray angle of incidence. Specifically, the entrance pupil center moves forward when the principal ray angle of incidence increases. For this reason, the principal ray angle of incidence from the same object is different from that of the pinhole camera model, and a position around the image deviates from that of the pinhole camera model. The deviation around the image varies depending on the distance of the object, and thus, is hardly corrected only by giving a certain correction amount, and an error occurs in the calculated distance.

The related art of PTL 2 creates the image correction information using the pattern of feature points on the chart installed at a location relatively close to the camera. Since the related art of PTL 1 uses the image correction information, the deviation on the image is small at a position close to the camera, and the deviation on the image increases as the position becomes distant. Since parallax of a distant object is small, the distance error increases if a parallax error occurs at the distant object.

The related art of PTL 3 does not consider movement of an entrance pupil center between different principal ray angles of incidence, and thus, hardly corrects a shift on an image that differs depending on a distance, and a distance error occurs.

An object of the present invention is to provide a stereo camera that is capable of reducing distance error created by entrance pupil center movement between different principal ray angles of incidence.

Solution to Problem

In order to achieve the above object, the present invention includes: a first imaging unit that captures a first image of an object; a second imaging unit that captures a second image of the object; a geometric correction information storage unit that stores a difference between a position of the object in the first image when an entrance pupil center indicating a point of intersection between a principal ray and an optical axis moves according to an angle of incidence and a position of the object in the first image when it is assumed that the entrance pupil center does not move according to the angle of incidence, as geometric correction information; a geometric correction unit that geometrically corrects the first image and the second image using the geometric correction information; and a parallax calculation unit that calculates parallax from the geometrically corrected first image and second image.

Advantageous Effects of Invention

According to the present invention, it is possible to reduce the distance error created by the entrance pupil center movement between different principal ray angles of incidence. Other objects, configurations, and effects which have not been described above become apparent from embodiments to be described hereinafter.

BRIEF DESCRIPTION OF DRAWINGS

FIG. 13 is a view illustrating an example of a table in an entrance pupil center movement information storage unit.

FIG. 14 is a view illustrating another example of the table in the entrance pupil center movement information storage unit.

FIG. 15 is a view illustrating still another example of the table in the entrance pupil center movement information storage unit.

DESCRIPTION OF EMBODIMENTS

Figure 1:
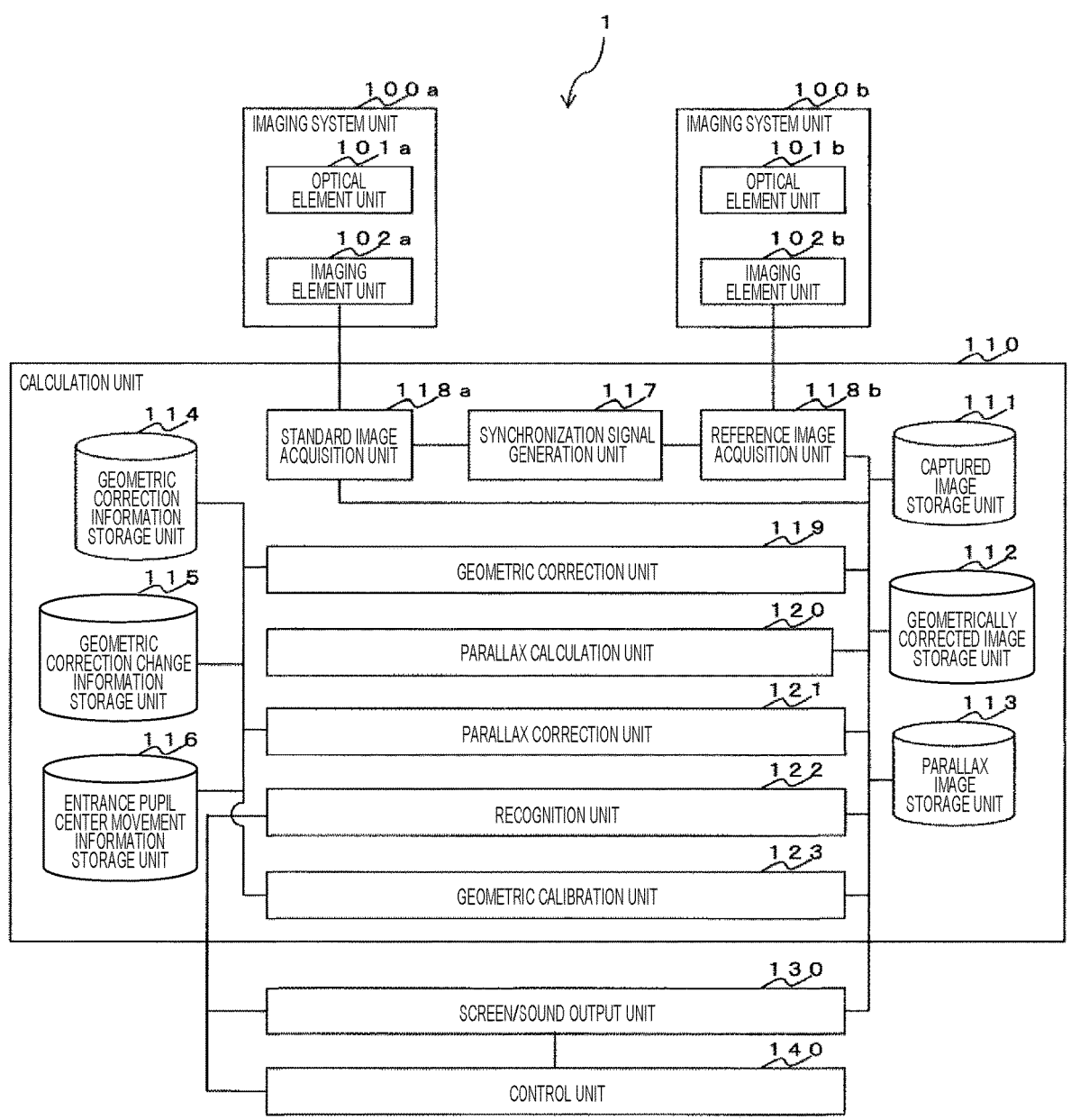
FIG. 1 is a diagram illustrating a configuration of a stereo camera according to one embodiment of the present invention.

FIG. 1 illustrates a configuration of a stereo camera 1 according to one embodiment of the present invention. Incidentally, the stereo camera 1 is a wide-angle camera having an angle of view of 40° or larger.

The stereo camera 1 according to one embodiment of the present invention includes an imaging system unit 100a, an imaging system unit 100b, a calculation unit 110, a screen/sound output unit 130, and a control unit 140.

The imaging system unit 100a such as a camera includes an optical element unit 101a and an imaging element unit 102a.

The optical element unit 101a such as a lens refracts light and forms an image on the imaging element unit 102a.

The imaging element unit 102a such as an imaging element receives the image of light refracted by the optical element unit 101a and generates an image corresponding to the intensity of the light.

The imaging system unit 100b such as a camera includes an optical element unit 101b and an imaging element unit 102b. Further, focal lengths of the imaging system unit 100a and the imaging system unit 100b have the same design value. Directions of optical axes of the imaging system unit 100a and the imaging system unit 100b are substantially the same.

The optical element unit 101b such as a lens refracts light and forms an image on the imaging element unit 102b.

The imaging element unit 102b such as an imaging element receives the image of light refracted by the optical element unit 101b and generates an image corresponding to the intensity of the light.

The image imaged by the imaging system unit 100a is an image serving as a standard when creating a parallax image, and thus, is referred to as a standard image. In other words, the imaging system unit 100a (first imaging unit) captures the standard image (first image) of an object. Further, the image imaged by the imaging system unit 100b is an image to be searched for a region that matches a region extracted from the standard image when creating a parallax image, and thus, and is referred to as a reference image. In other words, the imaging system unit 100b (second imaging unit) images the reference image (second image) of an object.

The calculation unit 110, constituted by a central processing unit (CPU), a memory, and the like, includes a captured image storage unit 111, a geometrically corrected image storage unit 112, a parallax image storage unit 113, a geometric correction information storage unit 114, a geometric correction change information storage unit 115, an entrance pupil center movement information storage unit 116, a synchronization signal generation unit 117, a standard image acquisition unit 118a, a reference image acquisition unit 118b, a geometric correction unit 119, a parallax calculation unit 120, a parallax correction unit 121, a recognition unit 122, and a geometric calibration unit 123.

The captured image storage unit 111 such as a memory stores images output from the imaging system unit 100a and the imaging system unit 100b.

The geometrically corrected image storage unit 112 such as a memory stores a standard image (standard image after geometric correction) and a reference image (reference image after geometric correction) obtained by geometrically correcting the imaged standard image (standard image before geometric correction) and (reference image before geometric correction).

The parallax image storage unit 113 such as a memory stores a parallax image.

The geometric correction information storage unit 114 such as a memory stores two-dimensional coordinates (geometric correction information) on an image after imaging with a distortion corresponding to each pixel on an image without any distortion in the standard image and the reference image. This geometric correction information is used for processing to correct a lens distortion and an optical axis deviation of the standard image and reference image after imaging performed by the geometric correction unit 119. That is, the geometric correction unit 119 geometrically corrects the standard image (first image) and the reference image (second image) using the geometric correction information.

The geometric correction information deviates from that of a pinhole camera model by a value of a positional deviation on an image when an object at a certain distance is projected between the case where the entrance pupil center moves and the case (pinhole camera model) where the entrance pupil center does not move.

In other words, the geometric correction information storage unit 114 stores the geometric correction information having an error depending on a difference between a position of an object in the standard image (first image) when the entrance pupil center indicating the point of intersection between the principal ray and the optical axis moves according to the angle of incidence and a position of the object in the standard image when it is assumed that the entrance pupil center does not move according to the angle of incidence. Further, the geometric correction information storage unit 114 stores the geometric correction information having an error depending on a difference between a position of the object in the reference image (second image) when an entrance pupil center indicating a point of intersection between a principal ray and an optical axis moves according to an angle of incidence and a position of the object in the reference image when it is assumed that the entrance pupil center does not move according to the angle of incidence.

Figure 5:
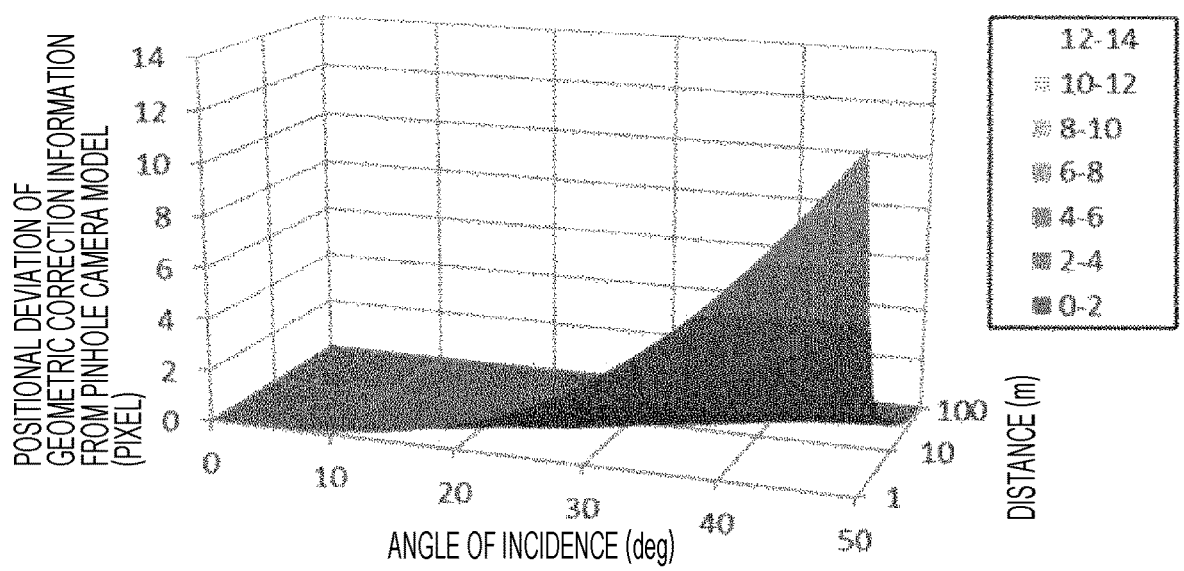
FIG. 5 is a view illustrating an example of a deviation in image correction information from a pinhole camera model for each distance and angle of incidence according to one embodiment of the present invention.

That is, as illustrated in FIG. 5, the geometric correction information matches a value of geometric correction information of the pinhole camera model when an object is projected at infinity, and a deviation is generated from the value of the geometric correction information in the case of assuming the pinhole camera model when the distance decreases and the principal ray angle of incidence increases.

The geometric correction change information storage unit 115 such as a memory stores a horizontal movement amount and a vertical movement amount of each of the standard image and the reference image configured for further movement in the horizontal direction and the vertical direction from the geometric correction information when the geometric correction unit 119 performs a geometric correction process on an image. Here, initial values of the horizontal movement amounts and the vertical movement amounts of the standard image and the reference image are zero. The horizontal movement amounts and the vertical movement amounts of the standard image and the reference image are calculated by the geometric calibration unit 123 and used to correct vertical and horizontal deviations caused by a change in time, a thermal change, and a mechanical deviation such as an impact vibration.

The entrance pupil center movement information storage unit 116 such as a memory stores a value of a movement amount of the entrance pupil center up to each angle of incidence using an angle of incidence of zero in the imaging system unit 100*a* and the imaging system unit 100*b* as a standard. In other words, the entrance pupil center movement information storage unit 116 stores each angle of incidence (θ1, θ2, and so on) and each movement amount (ΔL1, ΔL2, and so on) corresponding thereto in a table T1301 as illustrated in FIG. 13.

The synchronization signal generation unit 117 generates and transmits a synchronization signal.

After sending a synchronization signal and exposure time information to the imaging element unit 102*a* in accordance with the synchronization signal of the synchronization signal generation unit 117, the standard image acquisition unit 118*a* acquires an image generated by the imaging element unit 102*a* and stores the image in the captured image storage unit 111.

After sending a synchronization signal and exposure time information to the imaging element unit 102*b* in accordance with the synchronization signal of the synchronization signal generation unit 117, the reference image acquisition unit 118*b* acquires an image generated by the imaging element unit 102*b* and stores the image in the captured image storage unit 111.

The geometric correction unit 119 reads the geometric correction information from the geometric correction information storage unit 114, and reads the horizontal movement amounts and the vertical movement amounts of the standard image and the reference image from the geometric correction change information storage unit 115. The horizontal movement amounts and the vertical movement amounts of the standard image and the reference image are respectively added to two-dimensional coordinates (geometric correction information) on an image having a distortion corresponding to each pixel on an image having no distortion in the standard image and the reference image which are the geometric correction information. The geometric correction process is performed based on the standard image and the reference image after imaging, and the geometric correction information after the addition, thereby calculating the image having no distortion. These geometrically corrected standard image and reference image are stored in the geometrically corrected image storage unit 112.

The parallax calculation unit 120 reads the geometrically corrected standard image the reference image from the geometrically corrected image storage unit 112, and searches for a region at the same height on the reference image corresponding to a predetermined size of region (template image) extracted from the standard image. A difference between a position of the region on the reference image that matches the template image and a position of the template image on the standard image, that is, parallax is calculated. A parallax image is calculated by calculating the parallax for each region.

In other words, the parallax calculation unit 120 calculates the parallax from the geometrically corrected standard image (first image) and reference image (second image).

The parallax correction unit 121 reads the parallax image from the parallax image storage unit 113 and reads the movement amount of the entrance pupil center up to each angle of incidence using the angle of incidence of zero in the imaging system unit 100*a* and the imaging system unit 100*b*, as a standard, from the entrance pupil center movement information storage unit 116. The parallax correction unit 121 calculates a distance of each region on the image using the parallax image, focal length, pixel pitch, and baseline length of the imaging system unit 100*a* and the imaging system unit 100*b*.

Positions of each region on the standard image and the reference image are a geometrically corrected positions if the entrance pupil center moves. Therefore, the positions of each region on the geometrically corrected standard image and reference image after geometric correction if the entrance pupil center does not move are calculated using the position of each region on the standard image, the parallax and distance, the optical axis position, the parallax image, and the entrance pupil center movement amount up to each angle of incidence using the angle of incidence of zero as the standard, and then, calculates a difference between the positions, and uses the calculated difference as corrected parallax of each region.

In other words, the parallax correction unit 121 calculates the parallax (parallax in the pinhole camera model) when it is assumed that the entrance pupil center does not move according to the angle of incidence based on the entrance pupil center movement amount according to the angle of incidence of the principal ray of the object, and the parallax calculated by the parallax calculation unit (parallax when the entrance pupil center moves according to the angle of incidence), uses the calculated parallax as the corrected parallax. As a result, a parallax error due to the movement of the entrance pupil center can be reduced.

The parallax correction unit 121 stores the corrected parallax image in the parallax image storage unit. The parallax calculated by the parallax calculation unit 120 is the parallax if the entrance pupil center moves. With the above process, the parallax correction unit 121 corrects the parallax if the entrance pupil center moves to the parallax in the pinhole camera model (if the entrance pupil center does not move), which is a precondition for distance measurement of the stereo camera 1.

The recognition unit 122 reads the parallax image from the parallax image storage unit 113, and calculates a distance from the stereo camera 1 to the object on the image is calculated in each optical axis direction of the imaging system unit 100a and the imaging system unit 100b based on the parallax, the focal lengths (baseline lengths) of the imaging system unit 100a and the imaging system unit 100b, the focal length, and a size of one pixel. The distance is calculated for each region to calculate a distance image.

Next, the recognition unit 122 reads the geometrically corrected standard image from the geometrically corrected image storage unit 112, recognizes an object on the standard image and a position of the object on the standard image using the geometrically corrected standard image and distance image, and calculates a three-dimensional relative position and a relative speed of the object with respect to the stereo camera 1. Here, a coordinate system of the three-dimensional relative position with respect to the stereo camera 1 has the entrance pupil center of the imaging system unit 100a as the origin, an x coordinate in the right direction, a y coordinate in the downward direction, and a z coordinate in the optical axis direction with respect to the imaging system unit 100a. Further, the recognition unit 122 calculates a time until a collision based on the relative position and relative speed between the stereo camera 1 and the object, and determines whether the collision occurs within a predetermined time. The relative position, the relative speed, the collision determination result, and the collision time between the stereo camera 1 and the object are sent to the screen/sound output unit 130 and the control unit 140.

The geometric calibration unit 123 reads the geometrically corrected standard image and reference image from the geometrically corrected image storage unit 112, reads the parallax image from the parallax image storage unit 113, and calculates the horizontal movement amount and the vertical movement amount of the standard image that allows an optical axis (vanishing point) position on the geometrically corrected standard image to be a design value and the horizontal movement amount and the vertical movement amount of the reference image that allows the parallax to be zero at an optical axis (vanishing point) position on the geometrically corrected reference image based on these pieces of information. Results thereof are stored in the geometric correction change information storage unit 115.

The screen/sound output unit 130 such as a monitor and a speaker displays the standard image or the parallax image and the distance image on a screen. Further, a frame or a marker is displayed at the position of the object. At this time, a color of the frame or marker of the object when collision determination result by the recognition unit 122 indicates that the object will collide is set to be different from that of an object that does not collide. In a case where an object when the collision determination result by the recognition unit 122 indicates that the object will collide is exists, the screen/sound output unit 130 outputs a warning sound.

The control unit 140 such as a CPU generates a control signal based on the relative position, the relative speed, the collision time, and the collision determination result between the stereo camera 1 and the object, and outputs the control signal to the outside of the stereo camera 1.

An operation procedure of the stereo camera 1 according to the embodiment of the present invention illustrated in FIG. 1 will be described with reference to FIGS. 2 and 3. Incidentally, a subject of each step is the same in principle unless otherwise specified.

Step 201:

The synchronization signal generation unit 117 generates a synchronization signal and sends the synchronization signal to the standard image acquisition unit 118a and the reference image acquisition unit 118b. Immediately after receiving the synchronization signal from the synchronization signal generation unit 117, the standard image acquisition unit 118a sends information on the synchronization signal and an exposure time to the imaging element unit 102a. Immediately after receiving the synchronization signal and exposure time information from the standard image acquisition unit 118a, the imaging element unit 102a receives an image of light refracted by the optical element unit 101a for the exposure time, generates an image corresponding to the intensity of the light, and sends the image to the standard image acquisition unit 118a. The standard image acquisition unit 118a receives the image from the imaging element unit 102a and stores the image in the captured image storage unit 111.

Immediately after receiving the synchronization signal from the synchronization signal generation unit 117, the reference image acquisition unit 118b sends the synchronization signal and exposure time information to the imaging element unit 102b. Immediately after receiving the synchronization signal and exposure time information from the reference image acquisition unit 118b, the imaging element unit 102b receives an image of light refracted by the optical element unit 101b for the exposure time, generates an image corresponding to the intensity of the light, and sends the image to the reference image acquisition unit 118b. The reference image acquisition unit 118b receives the image from the imaging element unit 102b and stores the image in the captured image storage unit 111.

Step 202:

The geometric correction unit 119 reads the standard image and the reference image after imaging from the captured image storage unit 111. The geometric correction information of the standard image and the reference image is read from the geometric correction information storage unit 114, and the horizontal movement amounts and the vertical movement amounts of the standard image and the reference image are read from the geometric correction change information storage unit 115.

Formula (1) and Formula (2) are used to calculate a position (X1, Y1) of the standard image before imaging corresponding to a pixel (X2, Y2) of the geometrically corrected standard image based on coordinates (Fz (X2, Y2) and Fy (X2, Y2)) on the image after imaging corresponding to each pixel on the geometrically corrected standard image and a horizontal movement amount ΔX2 and a vertical movement amount ΔX2 of the standard image.

[Formula 1]

$$X1 = Fx(X2, Y2) + \Delta X2 \quad (1)$$

[Formula 2]

$$Y1 = Fy(X2, Y2) + \Delta Y2 \quad (2)$$

A two-dimensional linear interpolation is performed on luminance values of four pixels around the position (X1, Y1) on the standard image to calculate a luminance value of the pixel (X2, Y2) on the geometrically corrected standard image. The above procedure is performed on each pixel of the geometrically corrected standard image to calculate luminance values of the geometrically corrected standard image. Further, the above procedure is performed for the reference image to calculate luminance values of a geometrically corrected image of the reference image. The geometrically corrected standard image and reference image are stored in the geometrically corrected image storage unit 112.

Figure 4:
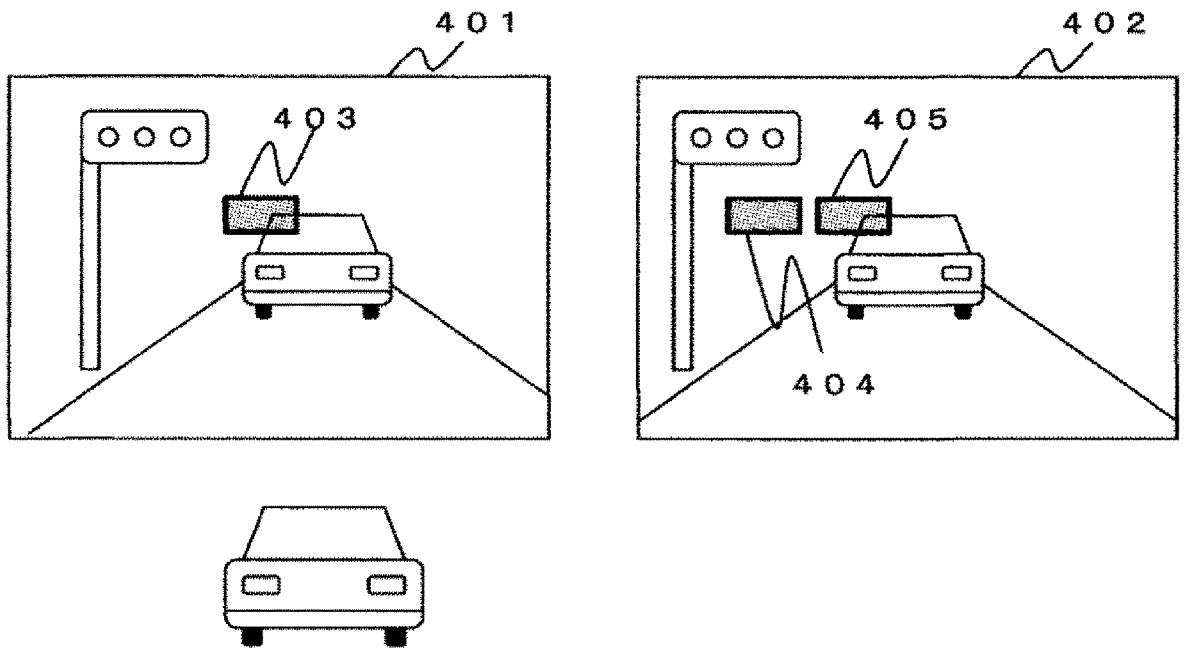
FIG. 4 is a view illustrating a standard image and a reference image.

Step 203:

The parallax calculation unit 120 reads the geometrically corrected images of the standard image and the reference image from the geometrically corrected image storage unit 112. As illustrated in FIG. 4, an image 403 (template image) which is a predetermined size of region on a geometrically corrected standard image 401 is extracted. In a geometrically corrected reference image 402, an image of a region on which the same object as that of the template image 403 comes out is searched by the following template matching.

An image 404 (searched image), which is a predetermined size of region on the reference image 402 at the same height as that of the template image 403, is extracted to calculate a sum (SAD, Sum Of Absolute Difference) of absolute values of differences between the luminance value of the template image 403 and the luminance value of the searched image 404. SAD is calculated for each of the searched images 404 on the reference image 402 at the same height as that of the template image 403, and a searched image 405 having the smallest SAD is searched.

Equiangular linear fitting is performed using the SAD of the searched image 405 and SAD of searched images adjacent by one pixel on the right and left to the searched image 405, and a subpixel of the searched image 405 on the reference image that most closely matches the template image 403 is calculated. The parallax of the template image 403 on the geometrically corrected standard image 401 is calculated by adding the subpixel to a difference in position between the template image 403 and the searched image 405.

Next, whether the parallax is valid or invalid is determined by the following two determination methods. Using each of the searched images 404 on the reference image 402 at the same height as that of the template image 403, it is determined that the parallax of such a region is invalid assuming that the template 403 and the searched image 405 do not match when a minimum value of the obtained SAD is equal to or larger than a threshold, and it is determined that the parallax is valid when the minimum value of the SAD is smaller than the threshold.

Further, a difference from adjacent SAD is calculated for the SAD representing the pattern matching degree. Locations where such difference values change from negative to positive values are detected, and locations where the SAD is the smallest and is the second smallest are detected from the locations. When a difference in SAD between the locations is smaller than a threshold, it is determined that the parallax of the region is invalid assuming that there is a pattern similar to the template image and there is a possibility of mismatching, and it is determined that the parallax is valid in the other case. Here, when there is only one location where the difference from the adjacent SAD changes from the negative to positive values, it is determined that the parallax is valid. A region that has been determined as valid by both the two determination methods is validated, and a region is invalidated if the region is determined as invalid by any one of the determination methods.

The above process is performed for all the regions on the geometrically corrected reference image, and the parallax on the entire standard image 401 is calculated. The parallax image calculated in this manner is stored in the parallax image storage unit 113.

Step 204:

The parallax correction unit 121 reads the parallax image from the parallax image storage unit 113 and reads the movement amount of the entrance pupil center up to each angle of incidence using the angle of incidence of zero in the imaging system unit 100*a* and the imaging system unit 100*b*, as a standard, from the entrance pupil center movement information storage unit 116. The parallax correction unit 121 calculates a distance of each region on the image using the parallax image, focal length, pixel pitch, and baseline length of the imaging system unit 100*a* and the imaging system unit 100*b*. Positions of each region on the standard image and the reference image are a geometrically corrected positions when the entrance pupil center moves.

Therefore, the positions of each region on the geometrically corrected standard image and reference image after geometric correction when the entrance pupil center does not move are calculated using the position of each region on the standard image, the parallax and distance, the optical axis position, the parallax image, and the entrance pupil center movement amount up to each angle of incidence using the angle of incidence of zero as the standard, and then, a difference between the positions is calculated, and the calculated difference is used as corrected parallax of each region. The corrected parallax image is stored in the parallax image storage unit. An operation procedure in this step is illustrated in FIG. 3.

Step 205:

The recognition unit 122 reads a parallax image from the parallax image storage unit 113 and reads a geometrically corrected image from the geometrically corrected image storage unit 112.

A distance L in the optical axis direction from the stereo camera 1 in a region on the parallax image is calculated using Formula (3). Here, f is a design value of a focal length of the imaging system unit 100*a* and the imaging system unit 100*b*, B is a distance (baseline length) between principal points of the imaging system unit 100*a* and the imaging system unit 100*b*, d is parallax, and c is a pixel pitch of the imaging element unit 102*a* and the imaging element unit 102*b*.

[Formula 3]

$$L = f \times B / (d \times c) \qquad (3)$$

This process is performed for all the regions of the parallax image, and the distance in the optical axis direction from the stereo camera 1 in the entire parallax image is calculated to create a distance image.

Next, the recognition unit 122 performs calculation of a position of a vanishing point on a processed image of the standard image, determination of an object such as an automobile and a pedestrian, calculation of a relative position and a relative speed of the object with respect to the stereo camera 1, and determination on a collision between the object and the stereo camera 1.

First, the recognition unit 122 calculates the position of the vanishing point on the standard image according to the following procedure. White lines on both sides at lane boundaries on the standard image are detected, and inclinations of the white lines on the standard image are calculated. Assuming that the white lines on both sides are straight lines, a position of a point where the white lines on both sides intersect each other on the standard image is calculated based on the calculated inclinations. This is the position of the vanishing point.

Next, the recognition unit 122 performs the detection of the object such as the automobile and the pedestrian in the following procedure. In the distance image, a region 1 in which pixels each having a distance within a predetermined range are connected is obtained. As examples of the predetermined range, a plurality of ranges overlapping each other every 2.5 m with a width of 5 m, such as 5 to 10 m, 7.5 to 12.5 m, and 10 to 15 m, are set. Vertical and horizontal lengths on the standard image of each of the regions 1 where the pixels each having the distance within the predetermined range are connected are obtained. A value obtained by multiplying the vertical length on the standard image of each of the regions 1, the distance, and the pixel pitch is divided by the focal length to calculate a three-dimensional vertical length of each of the regions 1. Similarly, a value obtained by multiplying the horizontal length on the standard image of each of the regions 1, the distance, and the pixel pitch is divided by the focal length to calculate the three-dimensional horizontal length of each of the regions 1. Formula (4) is used to approximately calculate a vertical position Vg on the standard image with respect to the ground of each of the regions 1. Here, Vv is a height of the vanishing point, Hi is a mounting height of the stereo camera 1, and Lr is an average distance of the regions 1. Further, this is a calculation formula when an assumption that the optical axes of the imaging system unit 100a and the imaging system unit 100b are substantially horizontal is set.

[Formula 4]

$$Vg = Vv - f \times Hi/(Lr \times c) \quad (4)$$

It is determined that the object in the region 1 is the automobile when the three-dimensional vertical and horizontal lengths of the region 1 are within a predetermined range of the automobile and a difference between the vertical position on the standard image of a lower limit of the region 1 and the vertical position on the standard image of the ground of the region 1 calculated by Formula (2) is within a threshold. Similarly, it is determined that the object in the region 1 is the pedestrian when the three-dimensional vertical and horizontal lengths of the region 1 are within a predetermined range of the pedestrian and the difference between the vertical position on the standard image of the lower limit of the region 1 and the vertical position on the standard image of the ground of the region 1 calculated by Formula (2) is within the threshold. These processes are performed for all the regions 1 to determine whether the object is the automobile or the pedestrian.

Next, the calculation of the relative position and the relative speed of the object with respect to the stereo camera 1 is performed according to the following procedure. For the region 1 in which the object is determined as the automobile or the pedestrian, a relative position (Xo, Yo, Zo) of the object with respect to the stereo camera 1 is calculated using Formulas (5) to (7). Here, (Uo, Vo) is a position on the standard image regarding the center of the region 1 in which the object is determined as the automobile or the pedestrian.

[Formula 5]

$$Xo = Lr \times c \times Uo/f \quad (5)$$

[Formula 6]

$$Yo = H + Lr \times c \times (Vo - Vv)/f \quad (6)$$

[Formula 7]

$$Zo = Lr \quad (7)$$

The processing of Steps 202 to 208 is repeatedly performed at a predetermined cycle. When the difference in position on the standard image of the region 1 detected in Step 205 between the previous processing and current processing is within a threshold, it is determined that the objects are the same, and a relative speed (Vx, Vy, Vz) of the object with respect to the stereo camera 1 is calculated by dividing a value, obtained by subtracting the relative position calculated in Step 205 of the previous processing from the relative position of the object with respect to the stereo camera 1 calculated in the current processing, by a time interval of the processing cycle of Steps 202 to 208.

Finally, the collision determination between the object and the stereo camera 1 is performed according to the following procedure. When the relative speed Vz of the object with respect to the stereo camera 1 is zero or more, it is determined that no collision will occur with the object in the region 1 in which the object is determined as the automobile or the pedestrian. When the relative speed Vz of the object with respect to the stereo camera 1 is negative, a time until a collision (collision time) is calculated by dividing the relative position Zo of the object with respect to the stereo camera 1 calculated in the current processing by an absolute value of the relative speed Vz of the object with respect to the stereo camera 1. Further, the relative position Xo of the object with respect to the stereo camera 1 at the time of the collision is calculated by adding the relative position Xo of the object to a value obtained by multiplying the relative speed Vx of the object with respect to the stereo camera 1 by the collision time.

Therefore, when the relative speed Vz of the object with respect to the stereo camera 1 is negative, the collision time is within a threshold, and the absolute value of the relative position Xo of the object with respect to the stereo camera 1 at the time of the collision is within a threshold, it is determined that collision will occur with the object in the region 1 in which the object is determined as the automobile or the pedestrian. Otherwise, it is determined that no collision will occur. The recognition unit 122 sends four corner positions on the standard image regarding the region 1 in which the object is determined as the automobile or the pedestrian, the relative position and the relative speed of the object with respect to the stereo camera 1, the collision determination result, and the collision time to the screen/sound output unit 130 and the control unit 140.

Step 206:

The geometric calibration unit 123 reads geometrically corrected standard image and reference image from the geometrically corrected image storage unit 112 and reads a parallax image from the parallax image storage unit 113. Left and right white lines on a road on the geometrically corrected standard image are detected, and approximate straight lines of the left and right white lines are calculated. A position of a point of intersection between the approximate lines of the left and right white lines is calculated, and a difference between the position of the point of intersection and a design value of a position of an optical axis is calculated as correction amounts in the horizontal direction and the vertical direction of the standard image assuming that the position of the point of intersection is the vanishing point and matches the position of the optical axis on the standard image. These correction amounts are set as the horizontal movement amount and the vertical movement amount of the standard image.

The geometric calibration unit 123 extracts the parallax corresponding to each position in the vertical direction of the left and right white lines on the image, and calculates approximate straight lines of the parallax with the positions in the vertical direction of the left and right white line on the image. From the approximate straight lines, the parallax of the white lines corresponding to the design value of the position in the vertical direction of the optical axis of the standard image is calculated. Originally, the parallax of the white line corresponding to the design value of the position in the vertical direction of the optical axis of the standard image is zero, and thus, this parallax of the white line corresponds to the horizontal correction amount of the reference image, and this correction amount is set as the horizontal movement amount of the reference image.

Similarly, the geometric calibration unit 123 detects left and right white lines on a road on the geometrically corrected reference image, and calculates approximate straight lines of the left and right white lines for the reference image. A position of a point of intersection between the approximate lines of the left and right white lines is calculated, and a difference between the position of the point of intersection and a design value of a position of an optical axis is calculated as a correction amount in the horizontal direction of the reference image assuming that the position of the point of intersection is the vanishing point and matches the position of the optical axis on the reference image. These correction amounts are used as the vertical movement amount of the reference image.

The horizontal movement amounts and the vertical movement amounts of the standard image and the reference image calculated by the above processing are sent to the geometric correction change information storage unit 115, and the geometric correction change information storage unit 115 stores the horizontal movement amounts and the vertical movement amounts of the standard image and the reference image.

Step 207:

The screen/sound output unit 130 receives the four corner positions on the standard image regarding the region 1 in which the object is determined as the automobile or the pedestrian, the relative position and the relative speed of the object with respect to the stereo camera 1, the collision determination result, and the collision time from the recognition unit 122. A geometrically corrected standard image is read from the geometrically corrected image storage unit 112. The standard image is displayed on the screen, and the region 1 in which the object is determined as the automobile or the pedestrian is displayed as a frame. Further, the display on the screen is performed by setting a color of the frame of the region 1 when the collision determination result indicates that the object will collide to be different from a color of the frame of the region 1 of the object when the collision determination result indicates that the object will not collide. In a case where the collision determination result indicates that the object will collide in the region 1, a warning sound is output.

Step 208:

The control unit 140 receives the four corner positions on the standard image regarding the region 1 in which the object is determined as the automobile or the pedestrian, the relative position and the relative speed of the object with respect to the stereo camera 1, the collision determination result, and the collision time from the recognition unit 122. In a case where the collision determination result indicates that the object will collide in the region 1 in which the object is determined as the automobile or the pedestrian, a control signal to avoid the collision is generated and output to the outside of the stereo camera 1.

An operation procedure of parallax correction in consideration of the entrance pupil center movement in Step 204 of the operation procedure of the stereo camera 1 according to one embodiment of the present invention will be described with reference to FIG. 3.

Step 301:

The parallax correction unit 121 reads the parallax image from the parallax image storage unit 113 and reads movement amounts (ΔL1, ΔL2, and so on) of the entrance pupil center up to each of angles of incidence (θ1, θ2, and so on) using the angle of incidence of zero in the imaging system unit 100a and the imaging system unit 100b, as a standard, from the entrance pupil center movement information storage unit 116.

Step 302:

The parallax correction unit 121 uses Formula (3) to calculate the distance L of each region on the standard image based on the parallax image, the focal length f, the pixel pitch c, and the baseline length B common to the imaging system unit 100a and the imaging system unit 100b.

Step 303:

The parallax correction unit 121 uses Formulas (8) to (10) to calculate the three-dimensional position (X, Y, Z) having the entrance pupil center of the imaging system unit 100a corresponding to each region when the entrance pupil moves as the origin based on the position (U, V) and the distance L of each region on the standard image, and the focal length f and the pixel pitch c common to the imaging system unit 100a and the imaging system unit 100b. Here, (U0, V0) is an optical axis position on the standard image.

[Formula 8]

$$X = L \times c \times (U-U0)/f \tag{8}$$

[Formula 9]

$$Y = L \times c \times (V-V0)/f \tag{9}$$

[Formula 10]

$$Z = L \tag{10}$$

Step 304:

The parallax correction unit 121 uses Formula (11) to calculate the angle of incidence θ of each region on the standard image based on the position (U, V) of each region on the standard image, the focal length f and the pixel pitch c common to the imaging system unit 100a and the imaging system unit 100b.

[Formula 11]

$$\theta = \arctan[\{(U-U0)^2 + (V-V0)^2\} \times c/f] \tag{11}$$

Step 305:

The parallax correction unit 121 extracts the movement amounts (for example, ΔL1 and ΔL2) of the entrance pupil center corresponding to two angles of incidence (for example, θ1 and θ2) close to the angle of incidence θ of a certain region calculated in Step 304 from among the moving amounts (ΔL1, ΔL2, and so on) of the entrance pupil center up to each of the angles of incidence (θ1, θ2, and so on) using the angle of incidence of zero in the imaging system unit 100a as the standard, and performs a linear interpolation to calculate the movement amount ΔL of the entrance pupil center of the certain region. The above processing is performed for each region.

In other words, the parallax correction unit 121 calculates the movement amount of the entrance pupil center according to the angle of incidence of the principal ray of the object based on each of angles of incidence stored in the entrance pupil center movement information storage unit 116 and the movement amount of the entrance pupil center corresponding to the angle of incidence. As a result, the movement amount of the entrance pupil center can be easily estimated.

Step 306:

The parallax correction unit 121 uses Formula (12) and Formula (13) to calculate a position (U', V') of each region on the standard image when the entrance pupil center does not move based on the three-dimensional position (X, Y, Z) of each region when the entrance pupil center moves calculated in Step 303 and the movement amount ΔL of the entrance pupil center calculated in Step 305.

In other words, the parallax correction unit 121 calculates the position (U', V') of the object in the standard image when the entrance pupil center does not move based on the three-dimensional position (X, Y, Z) of the imaging system unit 100a (first imaging unit) of the object and the movement amount ΔL of the entrance pupil center of the imaging system unit 100a according to the angle of incidence of the principal ray of the object.

[Formula 12]

$$U'=f\times X/\{c\times(L+\Delta L)\}+U0 \quad (12)$$

[Formula 13]

$$V'=f\times Y/\{c\times(L+\Delta L)\}+V0 \quad (13)$$

Step 307:

The parallax correction unit 121 subtracts the parallax d from a horizontal position U of each region on the reference image to calculate a horizontal position Uref of each region on the standard image. Formulas (8) to (10) are used to calculate a three-dimensional position (Xref, Yref, Zref) having the entrance pupil center of the imaging system unit 100b corresponding to each region when the entrance pupil moves as the origin based on a position (Uref, Vref) and the distance L of each region on the reference image, and the focal length f and the pixel pitch c common to the imaging system unit 100a and the imaging system unit 100b. Here, the vertical position of each region on the reference image is the same as that of the standard image (Vref=V).

Step 308:

The parallax correction unit 121 uses Formula (11) to calculate an angle of incidence θref of each region on the reference image based on the position (Uref, Vref) of each region on the reference image, the focal length f and the pixel pitch c common to the imaging system unit 100a and the imaging system unit 100b.

Step 309:

The parallax correction unit 121 extracts the movement amounts (for example, ΔL1 and ΔL2) of the entrance pupil center corresponding to two angles of incidence (for example, θ1 and θ2) close to the angle of incidence θref of a certain region calculated in Step 308 from among the moving amounts (θ1, θ2, and so on) of the entrance pupil center up to each of the angles of incidence using the angle of incidence of zero in the imaging system unit 100b as the standard, and performs a linear interpolation to calculate a movement amount ΔLref of the entrance pupil center of the certain region. The above processing is performed for each region.

Step 310:

The parallax correction unit 121 uses Formula (12) and Formula (13) to calculate a position (U'ref, V'ref) of each region on the reference image when the entrance pupil center does not move based on the three-dimensional position (Xref, Yref, Zref) of each region when the entrance pupil center moves calculated in Step 307 and the movement amount ΔLref of the entrance pupil center calculated in Step 309.

In other words, the parallax correction unit 121 calculates the position (U'ref, V'ref) of the object in the reference image (second image) when it is assumed that the entrance pupil center does not move based on the three-dimensional position (Xref, Yref, Zref) of the imaging system unit 100b (second imaging unit) of the object and the movement amount ΔLref of the entrance pupil center of the imaging system unit 100b according to the angle of incidence of the principal ray of the object.

Step 311:

A difference (|U'–U'ref|) between the horizontal positions of each region on the standard image and the reference image when the entrance pupil center does not move calculated in Step 306 and Step 310 is calculated and used as the parallax of each region when entrance pupil center does not move.

In other words, the parallax correction unit 121 uses the difference in the horizontal direction between the position (U', V') of the object in the standard image (first image) when the entrance pupil center does not move and the position of the object (U'ref, V'ref) in the reference image (second image) when it is assumed that the entrance pupil center does not move as the corrected parallax.

Here, a problem of the present embodiment will be described in detail with reference to FIG. 11. One of the preconditions for distance measurement of the stereo camera is that a point of intersection (entrance pupil center) between a principal ray and an optical axis 1101 does not move (the pinhole camera model) between angles of incidence of the principal ray (principal rays 1105, 1108 and the like to be described later). In the wide-angle camera, however, the position of the entrance pupil center moves forward when the principal ray angle of incidence increases.

Figure 11:
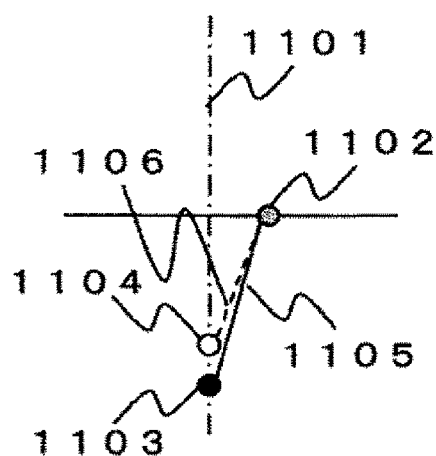
FIG. 11 is a view illustrating a principal ray angle of incidence and an image deviation of a model in which an entrance pupil center moves and a pinhole camera model.
Figure 11:
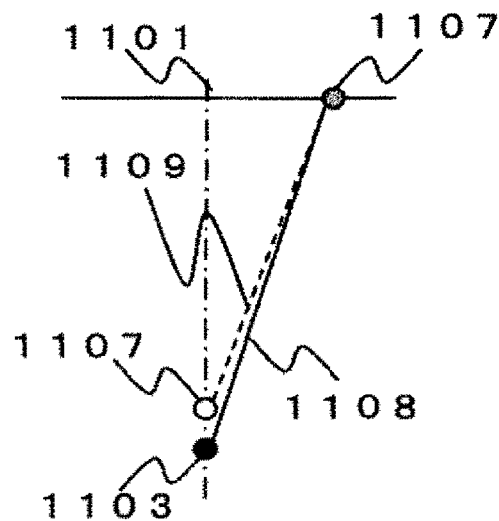
Figure 11:
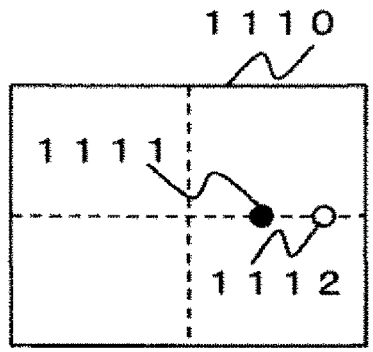
Figure 11:
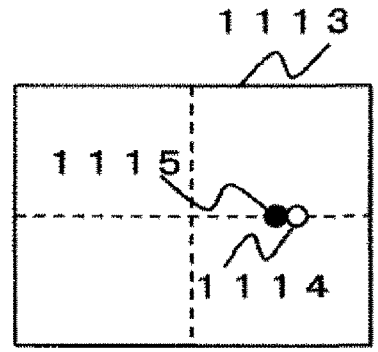

For example, when a distance to an object 1102 is short as illustrated in FIG. 11, an angle of incidence of a principal ray 1106 incident on a position 1104 of the entrance pupil center in the case where the entrance pupil center moves from the object 1102 is greatly different from an angle of incidence of the principal ray 1105 incident on a position 1103 of the entrance pupil center in the case where the entrance pupil center does not move from the object 1102, and thus, there is a large deviation between a position 1112 and a position 1111 on an image 1110 in the case where the entrance pupil center moves and the case where the entrance pupil center does not move.

On the other hand, when a distance to an object 1107 is long, there is a small difference between an angle of incidence of a principal ray 1109 incident on a position 1107 of the entrance pupil center in the case where the entrance pupil center moves from the object 1107 and an angle of incidence of the principal ray 1108 incident on a position 1103 of the entrance pupil center in the case where the entrance pupil center does not move from the object 1107, and thus, there is a small deviation between a position 1114 and a position 1115 on an image 1113 in the case where the entrance pupil center moves and the case where the entrance pupil center does not move.

As described above, an optical system model is different from the pinhole camera model in the wide-angle camera in which the entrance pupil center moves, and thus, it is difficult to geometrically correct the image such that the parallax can be accurately calculated at any distance.

Figure 7:
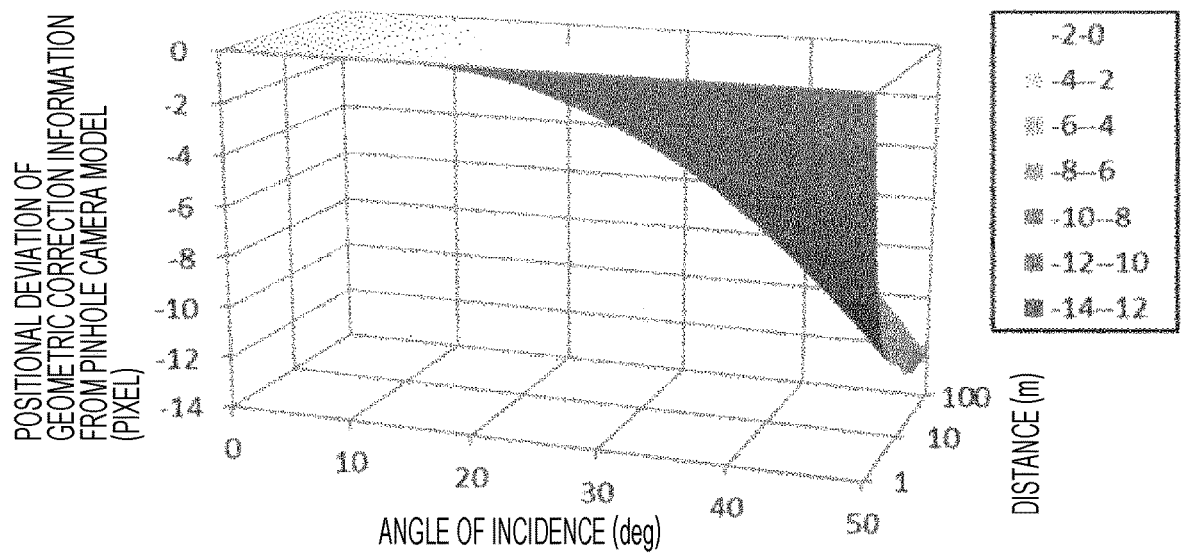
FIG. 7 is a view illustrating an example of a deviation of image correction information from a pinhole camera model for each distance and angle of incidence when the image correction information is created at a close position.
Figure 8:
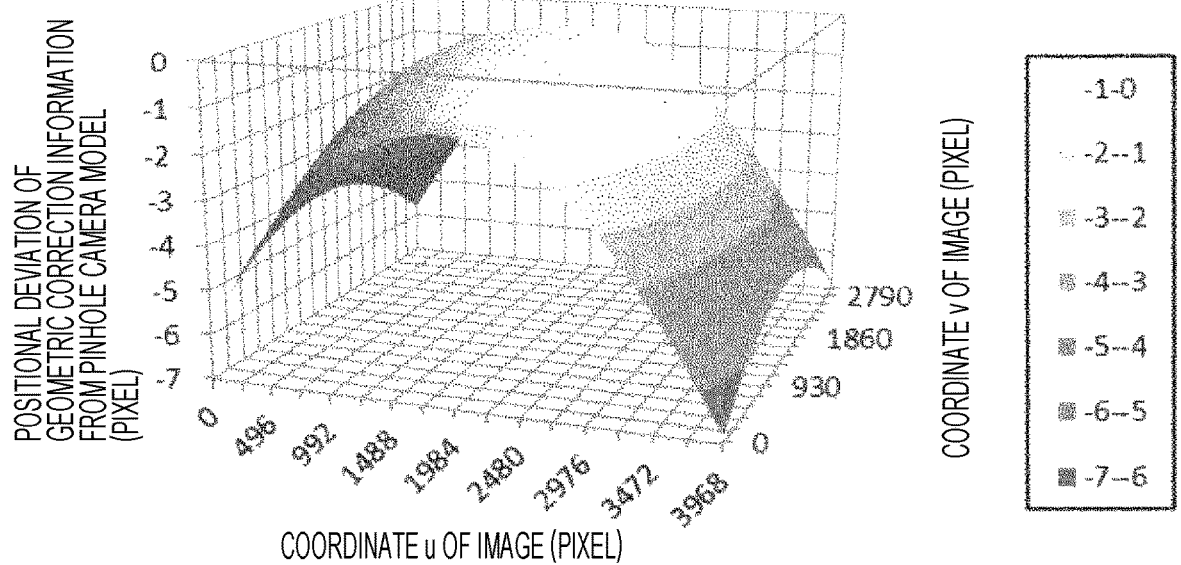
FIG. 8 is a view illustrating an example of a deviation distribution of image correction information from a pinhole camera model on an image at infinity when the image correction information is created at a close position.
Figure 9:
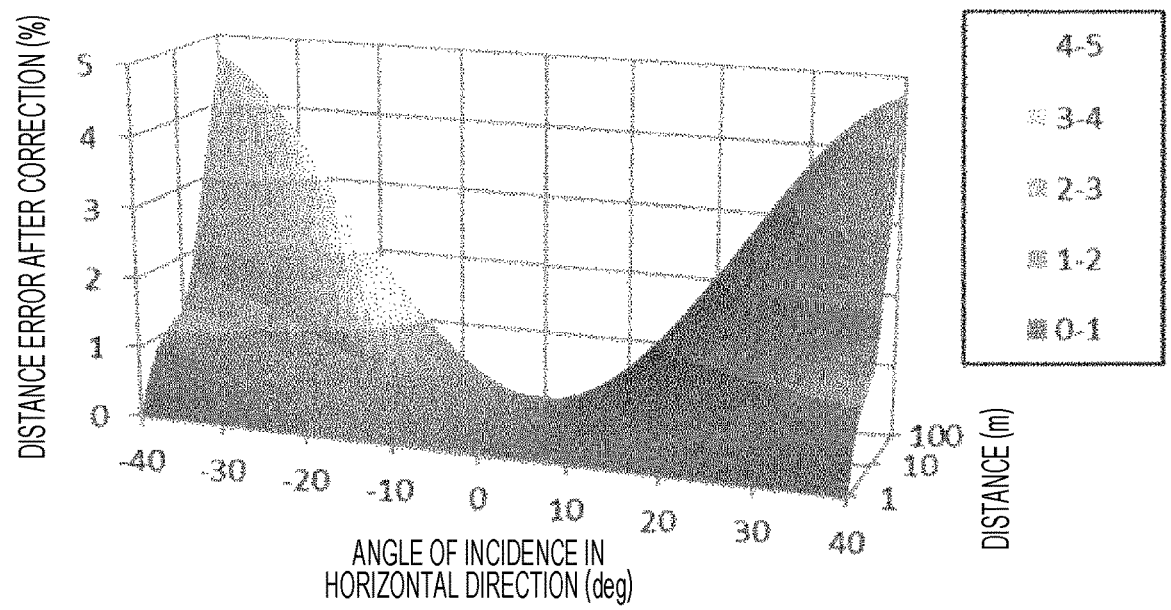
FIG. 9 is a view illustrating an example of a distance error when image correction information is created at a close position.

The related art of PTL 2 captures an image of a chart installed at a relatively short distance and creates geometric correction information of the image based on a pattern on the chart. For this reason, the geometric correction information of the image greatly deviates from that in the pinhole camera model if an angle of incidence is large at a short distance as illustrated in FIG. 7, and the deviation of the geometric correction information of the image at infinity from that in the pinhole camera model increases in an edge region of the image as illustrated in FIG. 8. As a result, an accurate distance can be calculated at a short distance as illustrated in FIG. 9, but a distance error becomes large at a far distance.

Figure 2:
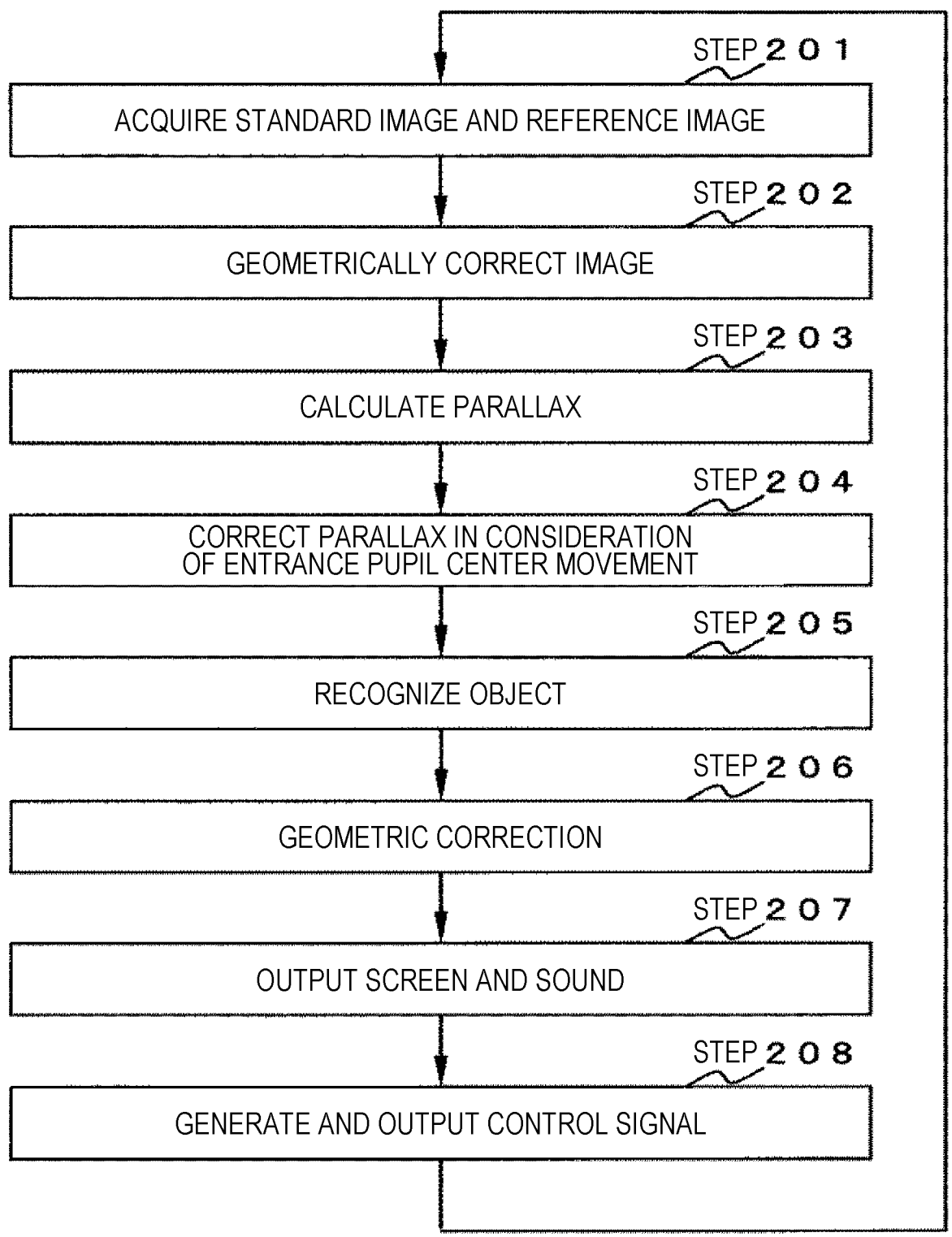
FIG. 2 is a diagram illustrating an operation of the stereo camera illustrated in FIG. 1.
Figure 6:
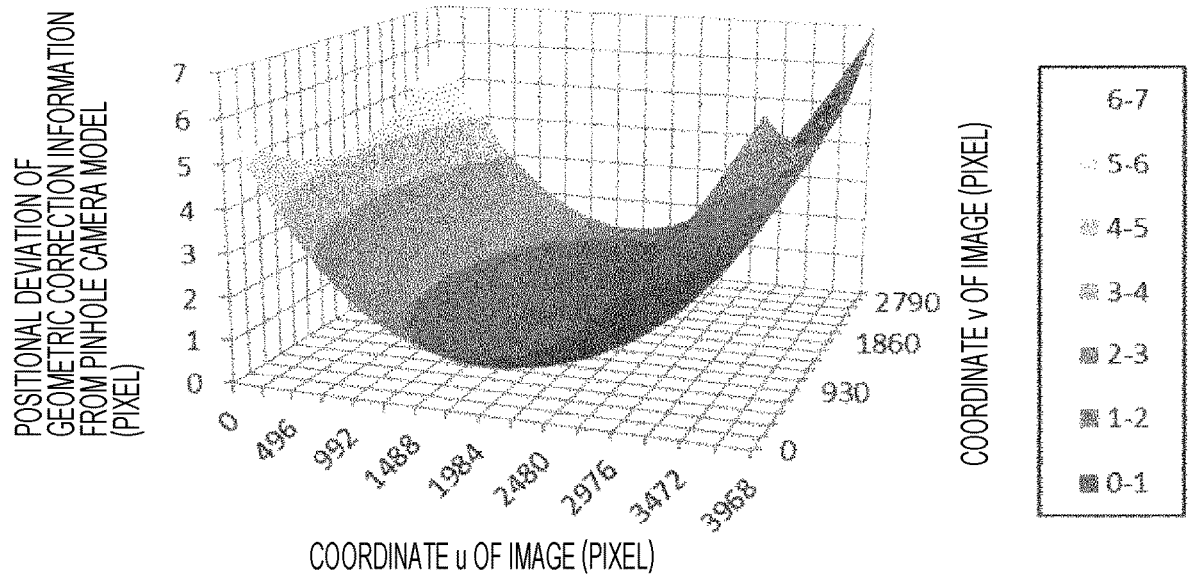
FIG. 6 is a view illustrating an example of a deviation distribution of image correction information from a pinhole camera model on an image at a certain distance according to one embodiment of the present invention.
Figure 10:
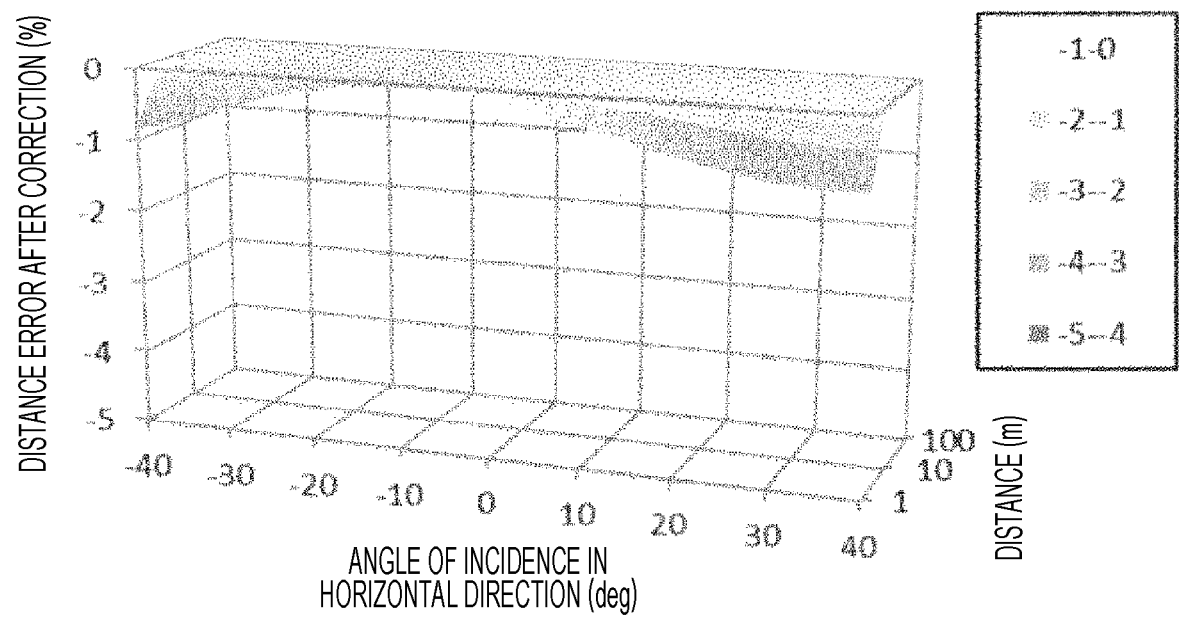
FIG. 10 is a view illustrating an example of a distance error when the image correction information of the present invention is used.

As illustrated in FIG. 5, the stereo camera 1 according to the embodiment of the present invention illustrated in FIG. 1 stores the geometric correction information in which the deviation from the geometric correction information obtained assuming the pinhole camera model is zero at infinity in the geometric correction information storage unit 114, and the geometric correction unit 119 uses the geometric correction information having the above-described feature to correct the distortion on the standard image and the reference image in Step 202 of the operation procedure (FIG. 2). Thus, there is no positional deviation on the standard image and the reference image from the pinhole camera model at infinity, and the parallax error is reduced. At a close distance, the positional error on the standard image and the reference image from the pinhole camera model becomes large, but the parallax is large, so that the distance error is suppressed to be smaller than that in the related art as illustrated in FIG. 10. Here, the deviation between the geometric correction information at infinity and that in the pinhole camera model is illustrated in FIG. 6.

In Step 204 (FIG. 3) of the operation procedure (FIG. 2) of the stereo camera 1 according to the embodiment of the present invention illustrated in FIG. 1, the parallax correction unit 121 corrects the parallax in the case where the entrance pupil center moves to the parallax in the case where the entrance pupil center does not move (the pinhole camera model), and thus, the parallax error caused by the entrance pupil center movement is reduced. Further, the recognition unit 122 can calculate the distance based on the corrected parallax image and accurately calculate the collision time to the object in Step 205, and thus, a collision prevention function can operate normally.

In Step 206 of the operation procedure (FIG. 2) of the stereo camera 1 according to the embodiment of the present invention illustrated in FIG. 1, the horizontal movement amounts (correction amounts in the horizontal direction) of the standard image and the reference image calculated by the geometric calibration unit 123 using the parallax accurately corrected in Step 204 and the geometrically corrected standard image and reference image are also accurate. Further, the geometric correction unit 119 uses the horizontal movement amounts of the standard image and the reference image accurately obtained in Step 206 to geometrically correct the image in Step 202 so that the image distortion is accurately corrected. In Step 203, the parallax image is accurately calculated using the standard image and reference image geometrically corrected with accuracy in Step 202.

As described above, it is possible to reduce the distance error created by the entrance pupil center movement between different principal ray angles of incidence according to the present embodiment.

Incidentally, the stereo camera 1 of the present invention is not limited to the embodiment described as above, and can be applied with various modifications. Hereinafter, modifications of the stereo camera 1 of the present invention will be described.

(Modification 1-1)

In the stereo camera 1 according to the embodiment of the present invention illustrated in FIG. 1, the entrance pupil center movement information storage unit 116 stores coefficients ($a_n$, $a_{n-1}$ . . . , and $a_0$) of a polynomial expression of the principal ray angle of incidence $\theta$ and the entrance pupil center movement amount $\Delta L$ of the imaging system unit 100a and the imaging system unit 100b, in a table T1401 as illustrated in FIG. 14, instead of storing the movement amount $\Delta L$ of the entrance pupil center between different principal ray angles of incidence $\theta$ of the imaging system unit 100a and the imaging system unit 100b.

In Step 301 of the operation procedure (FIG. 3), the parallax correction unit 121 reads the coefficient of the polynomial expression of the principal ray angle of incidence and the movement amount of the entrance pupil center from the entrance pupil center movement information storage unit 116, and the parallax correction unit 121 calculates the movement amount of the entrance pupil center from the angle of incidence of each region using the polynomial expression of the principal ray angle of incidence and the movement amount of the entrance pupil center in Step 304 and Step 308. In other words, the parallax correction unit 121 calculates the movement amount of the entrance pupil center according to the angle of incidence of the principal ray of the object using the polynomial expression. As a result, the movement amount of the entrance pupil center can be easily estimated.

Even in this case, the parallax when the entrance pupil center moves can be corrected to the parallax when the entrance pupil center does not move, and thus, the parallax error caused by the movement of the entrance pupil center can be reduced.

(Modification 1-2)

In the stereo camera 1 according to the embodiment of the present invention illustrated in FIG. 1, the entrance pupil center movement information storage unit 116 stores a correction amount Cx of the geometric correction information of the imaging system unit 100a and the imaging system unit 100b between a case where the entrance pupil center moves every predetermined distance L and every predetermined principal ray angle of incidence $\theta$ and a case where the entrance pupil center does not move, in a table T1501 as illustrated in FIG. 15, instead of storing the movement amount $\Delta L$ of the entrance pupil center between different principal ray angles of incidence $\theta$ of the imaging system unit 100a and the imaging system unit 100b.

In other words, the entrance pupil center movement information storage unit 116 stores the correction amount Cx of the geometric correction information corresponding to a combination of each of the distances L of the object and each of the angles of incidence $\theta$.

Figure 3:
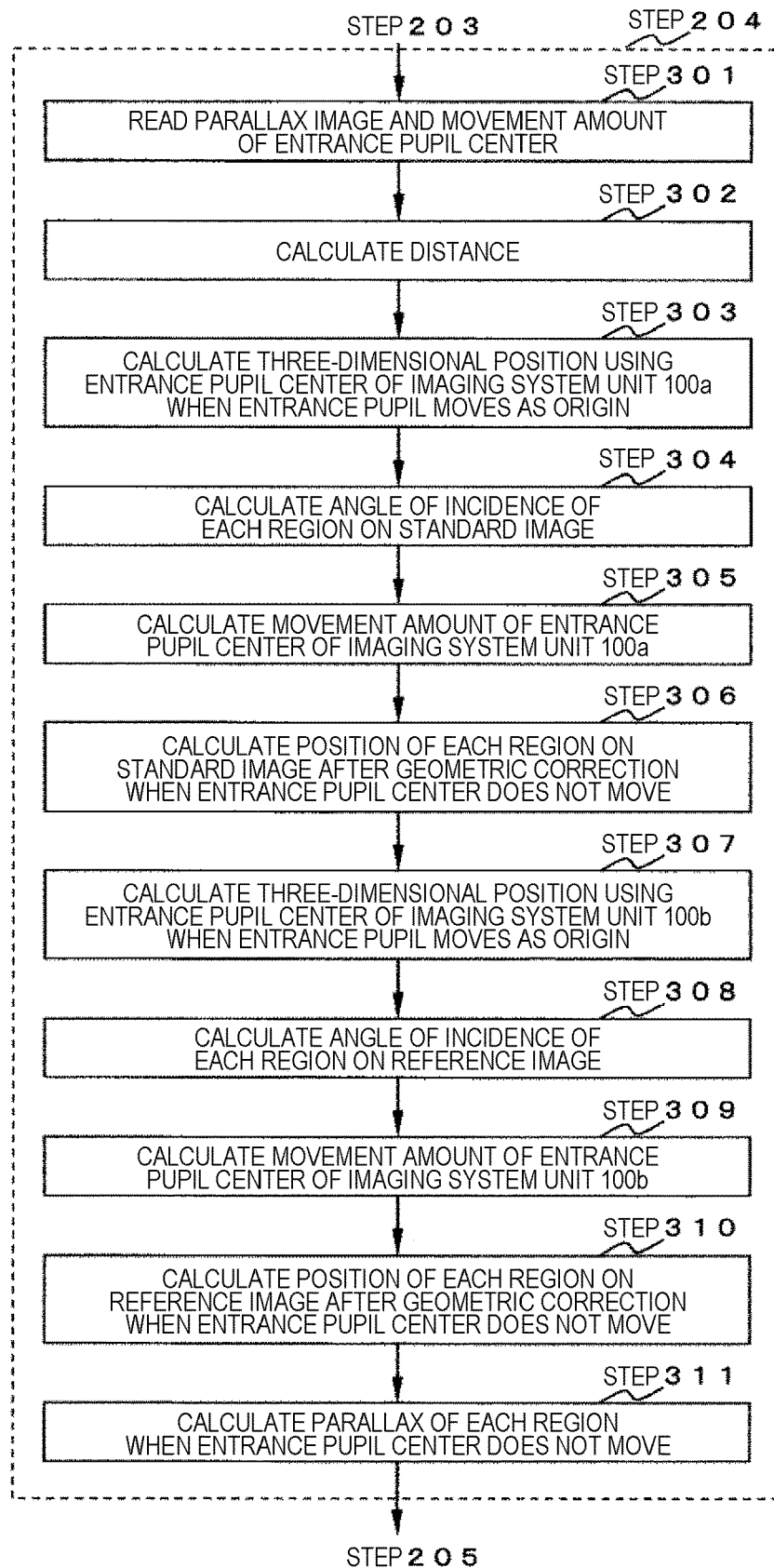
FIG. 3 is a diagram illustrating an example of a parallax correction operation in consideration of entrance pupil center movement illustrated in FIG. 2.
Figure 12:
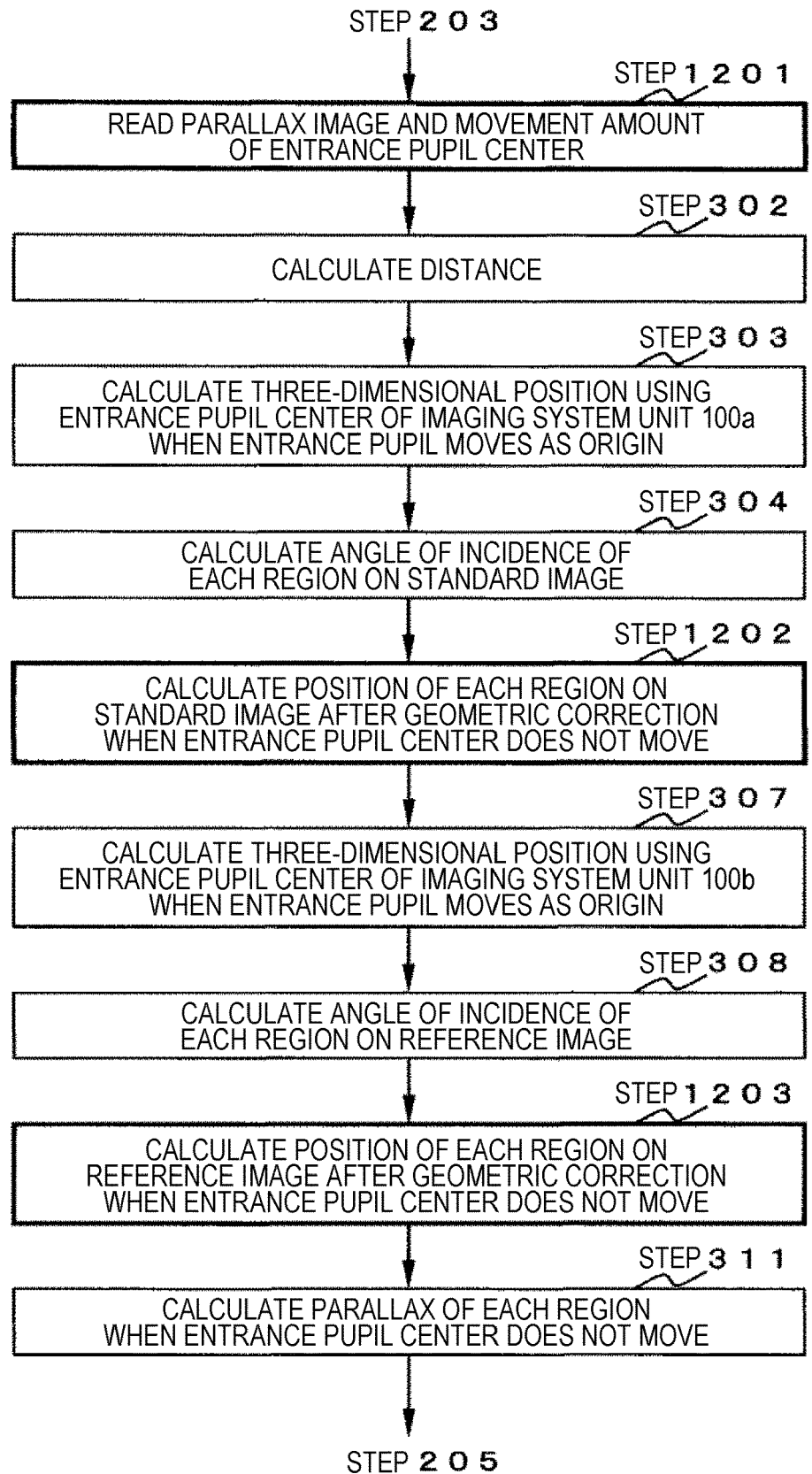
FIG. 12 is a diagram illustrating a modification of the parallax correction operation in consideration of the entrance pupil center movement illustrated in FIG. 2.

Even when the operation procedure illustrated in FIG. 12 is implemented instead of the operation procedure illustrated in FIG. 3 of the parallax correction in consideration of the movement of the entrance pupil center in Step 204 of the operation procedure (FIG. 2) of the stereo camera 1 according to the embodiment of the present invention illustrated in FIG. 1, the parallax when the entrance pupil center moves can be corrected to the parallax when the entrance pupil center does not move, and thus, the parallax error caused by the movement of the entrance pupil center can be reduced.

The operation procedure of parallax correction in consideration of the entrance pupil center movement in Step 204 of the operation procedure (FIG. 2) of the stereo camera 1 according to one embodiment of the present invention illustrated in FIG. 1 will be described with reference to FIG. 12. Here, the description of Steps 302 to 304, Step 307, Step 308, and Step 311 already described will be omitted.

Step 1201:

The parallax correction unit 121 reads the parallax image from the parallax image storage unit 113 and reads the correction amount of the geometric correction information of the imaging system unit 100a and the imaging system unit 100b between the case where the entrance pupil center moves and the case where the entrance pupil center does not move for each predetermined distance L and for each predetermined principal ray angle of incidence θ from the entrance pupil center movement information storage unit 116.

Step 1202:

The parallax correction unit 121 searches for four correction amounts of the geometric correction information close to a distance and an angle of incidence of a certain region on the standard image calculated in Step 302 and Step 304, respectively from the correction amounts of the geometric correction information of the imaging system unit 100a between the case where the entrance pupil center moves and the case where the entrance pupil center does not move every predetermined distance and every predetermined principal ray angle of incidence, and interpolates the four values to calculate the correction amount of the geometric correction information at the distance and the angle of incidence of the certain region on the standard image. A position obtained by changing the position of the certain region on the standard image by the correction amount in the optical axis direction is calculated. The above processing is performed for all the regions on the standard image.

In other words, the parallax correction unit 121 calculates a position (first position) of the object in the standard image (first image) when it is assumed that the entrance pupil center does not move based on the correction amount Cx of the geometric correction information corresponding to the combination of each of the distances L of the object and each of the angles of incidence θ stored in the entrance pupil center movement information storage unit 116.

Step 1203:

The parallax correction unit 121 searches for four correction amounts of the geometric correction information close to a distance and an angle of incidence of a certain region on the image calculated in Step 302 and Step 308, respectively from the correction amounts of the geometric correction information of the imaging system unit 100b between the case where the entrance pupil center moves and the case where the entrance pupil center does not move every predetermined distance and every predetermined principal ray angle of incidence, and interpolates the four values to calculate the correction amount of the geometric correction information at the distance and the angle of incidence of the certain region on the reference image. A position obtained by changing the position of the certain region on the reference image by the correction amount in the optical axis direction is calculated. The above processing is performed for all the regions on the reference image.

In other words, the parallax correction unit 121 calculates a position (second position) of the object in the reference image (second image) when it is assumed that the entrance pupil center does not move based on the correction amount Cx of the geometric correction information corresponding to the combination of each of the distances L of the object and each of the angles of incidence θ stored in the entrance pupil center movement information storage unit 116.

(Modification 1-3)

In Step 206 of the operation procedure (FIG. 2) of the stereo camera 1 according to the embodiment of the present invention illustrated in FIG. 1, the geometric calibration unit 123 reads the geometrically corrected standard image from the geometrically corrected image storage unit 112 and reads the parallax image from the parallax image storage unit 113, and the geometric calibration unit 123 extracts the parallax corresponding to each position in the vertical direction on the left and right white lines on the image and calculates the approximate straight lines of the vertical positions of the left and right white lines on the image and the parallax. From the approximate straight lines, the parallax of the white lines corresponding to the design value of the position in the vertical direction of the optical axis of the standard image is calculated.

Originally, the parallax of the white line corresponding to the design value of the vertical position of the optical axis of the standard image is zero, and thus, the parallax of the white line corresponds to the horizontal correction amount of the reference image. This correction amount is used as the horizontal movement amount of the reference image, the horizontal movement amount of the reference image is sent to the geometric correction change information storage unit 115, and the geometric correction change information storage unit 115 can correct the parallax accurately even when the horizontal movement amount of the reference image is stored. Here, instead of the horizontal movement amount of the reference image, the horizontal movement amount of the standard image may be corrected by reversing the sign of the correction amount.

Incidentally, the above-described embodiments have been described in detail in order to describe the present invention in an easily understandable manner, and are not necessarily limited to one including the entire configuration that has been described above. Further, configurations of another embodiment can be substituted for some configurations of a certain embodiment, and further, a configuration of another embodiment can be added to a configuration of a certain embodiment. Further, addition, deletion or substitution of other configurations can be made with respect to some configurations of each embodiment.

Further, a part or all of each of the above-described configurations, functions, and the like may be realized, for example, by hardware by designing with an integrated circuit and the like. Further, each of the above-described configurations, functions, and the like may also be realized by software by causing a processor to interpret and execute a program for realizing each of the functions. Information such as programs, tables, and files that realize the respective functions can be installed in a recording device such as a memory, a hard disk, and a solid state drive (SSD), or a recording medium such as an IC card, an SD card, and a DVD.

Incidentally, the embodiments of the present invention may be provided as the following aspects.

(1) A stereo camera including: two imaging units that capture a standard image and a reference image; a storage unit that holds geometric correction information (correction amount of each pixel) for the standard image and reference image, which each have an error depending on differences between positions on the standard image and the reference image in a case where a point of intersection (an entrance pupil center) between a principal ray and an optical axis moves according to an angle of incidence and positions on the standard image and the reference image in a case where the entrance pupil center does not move; an image correction unit that geometrically corrects the standard image and the reference image using the geometric correction information for the standard image and the reference image; and a parallax image generation unit that generates a parallax image.

(2) The stereo camera of (1) further including a parallax correction unit that calculates an image deviation between the case where the entrance pupil center moves and the case where the entrance pupil center does not move using a movement amount of the entrance pupil center for each angle of incidence and the parallax image and corrects the parallax image.

(3) The stereo camera of (2) further including a geometric calibration unit that corrects a horizontal movement amount of the standard image or the reference image using the standard image and the parallax image corrected by the parallax correction unit.

According to (1) to (3) above, the image correction information that matches the position on the image in the pinhole camera model at infinity is used so that the image deviation caused by the entrance pupil center movement between different principal ray angles of incidence is reduced at infinity, and the distance error at a distant place where a large error occurs even with a small parallax error is reduced.

Further, the movement amount of the entrance pupil center between different principal ray angles of incidence and the parallax image are used to calculate and correct the parallax deviation for each distance so that the distance error caused by the entrance pupil center movement between different principal ray angles of incidence is reduced.

REFERENCE SIGNS LIST 1 stereo camera
100a imaging system unit
100b imaging system unit
101a optical element unit
101b optical element unit
102a imaging element unit
102b imaging element unit
110 calculation unit
111 captured image storage unit
112 geometrically corrected image storage unit
113 parallax image storage unit
114 geometric correction information storage unit
115 geometric correction change information storage unit
116 entrance pupil center movement information storage unit
1117 synchronization signal generation unit
118a standard image acquisition unit
118b reference image acquisition unit
119 geometric correction unit
120 parallax calculation unit
121 parallax correction unit
122 recognition unit
123 geometric calibration unit
130 screen/sound output unit
140 control unit
401 standard image
402 reference image
403 template image of standard image
404 searched image of reference image
405 searched image that most closely matches template image
1101 optical axis
1102 object
1103 non-moving entrance pupil center
1104 moving entrance pupil center
1105 principal ray from object to entrance pupil center when entrance pupil center does not move
1106 principal ray from object to entrance pupil center when entrance pupil center moves
1107 moving entrance pupil center
1108 principal ray from object to entrance pupil center when entrance pupil center does not move
1109 principal ray from object to entrance pupil center when entrance pupil center moves
1110 image
1111 position of object on image when entrance pupil center does not move
1112 position of object on image when entrance pupil center moves
1113 image
1114 position of object on image when entrance pupil center does not move
1115 position of object on image when entrance pupil center moves

The invention claimed is:

1. A stereo camera comprising:
a first imaging unit that captures a first image of an object;
a second imaging unit that captures a second image of the object;
a geometric correction information storage unit that stores geometric correction information of the first image having an error depending on a difference between a position of the object in the first image when an entrance pupil center indicating a point of intersection between a principal ray and an optical axis moves according to an angle of incidence and a position of the object in the first image when it is assumed that the entrance pupil center does not move according to the angle of incidence, and stores geometric correction information of the second image having an error depending on a difference between a position of the object in the second image when an entrance pupil center indicating a point of intersection between a principal ray and an optical axis moves according to an angle of incidence and a position of the object in the second image when it is assumed that the entrance pupil center does not move according to the angle of incidence;
a geometric correction unit that geometrically corrects the first image and the second image using the geometric correction information; and
a parallax calculation unit that calculates parallax from the first image and the second image geometrically corrected.

2. The stereo camera according to claim 1, further comprising
a parallax correction unit that calculates parallax when it is assumed that the entrance pupil center does not move according to the angle of incidence based on a movement amount of the entrance pupil center according to the angle of incidence of the principal ray of the object and the parallax calculated by the parallax calculation unit and uses the calculated parallax as corrected parallax.

3. The stereo camera according to claim 2, further comprising an entrance pupil center movement information storage unit that stores each of the angles of incidence and a movement amount of the entrance pupil center corresponding to the angle of incidence, wherein the parallax correction unit calculates a movement amount of the entrance pupil center corresponding to the angle of incidence of the principal ray of the object based on each of the angles of incidence stored in the entrance pupil center movement information storage unit and a movement amount of the entrance pupil center corresponding to the angle of incidence.

4. The stereo camera according to claim 3, wherein the parallax correction unit calculates a first position of the object in the first image when the entrance pupil center does not move based on a three-dimensional position in the first imaging unit of the object and a movement amount of the entrance pupil center in the first imaging unit according to the angle of incidence of the principal ray of the object, calculates a second position of the object in the second image when it is assumed that the entrance pupil center does not move based on a three-dimensional position in the second imaging unit of the object and a movement amount of the entrance pupil center in the second imaging unit according to the angle of incidence of the principal ray of the object, and uses a difference in a horizontal direction between the first position and the second position as corrected parallax.

5. The stereo camera according to claim 2, further comprising an entrance pupil center movement information storage unit that stores coefficients of a polynomial expression of the angle of incidence and the entrance pupil center movement amount, wherein the parallax correction unit calculates the entrance pupil center movement amount according to the angle of incidence of the principal ray of the object using the polynomial expression.

6. The stereo camera according to claim 2, further comprising an entrance pupil center movement information storage unit that stores a correction amount of the geometric correction information corresponding to a combination of each of distances of the object and each of the angles of incidence, wherein the parallax correction unit calculates a first position of the object in the first image when it is assumed that the entrance pupil center does not move and a second position of the object in the second image when it is assumed that the entrance pupil center does not move based on the correction amount of the geometric correction information corresponding to the combination of each of the distances of the object and each of the angles of incidence stored in the entrance pupil center movement information storage unit, and uses a difference in a horizontal direction between the first position and the second position as corrected parallax.

7. The stereo camera according to claim 1, wherein an angle of view is 40° or larger.

* * * * *